UNITED STATES PATENT OFFICE.

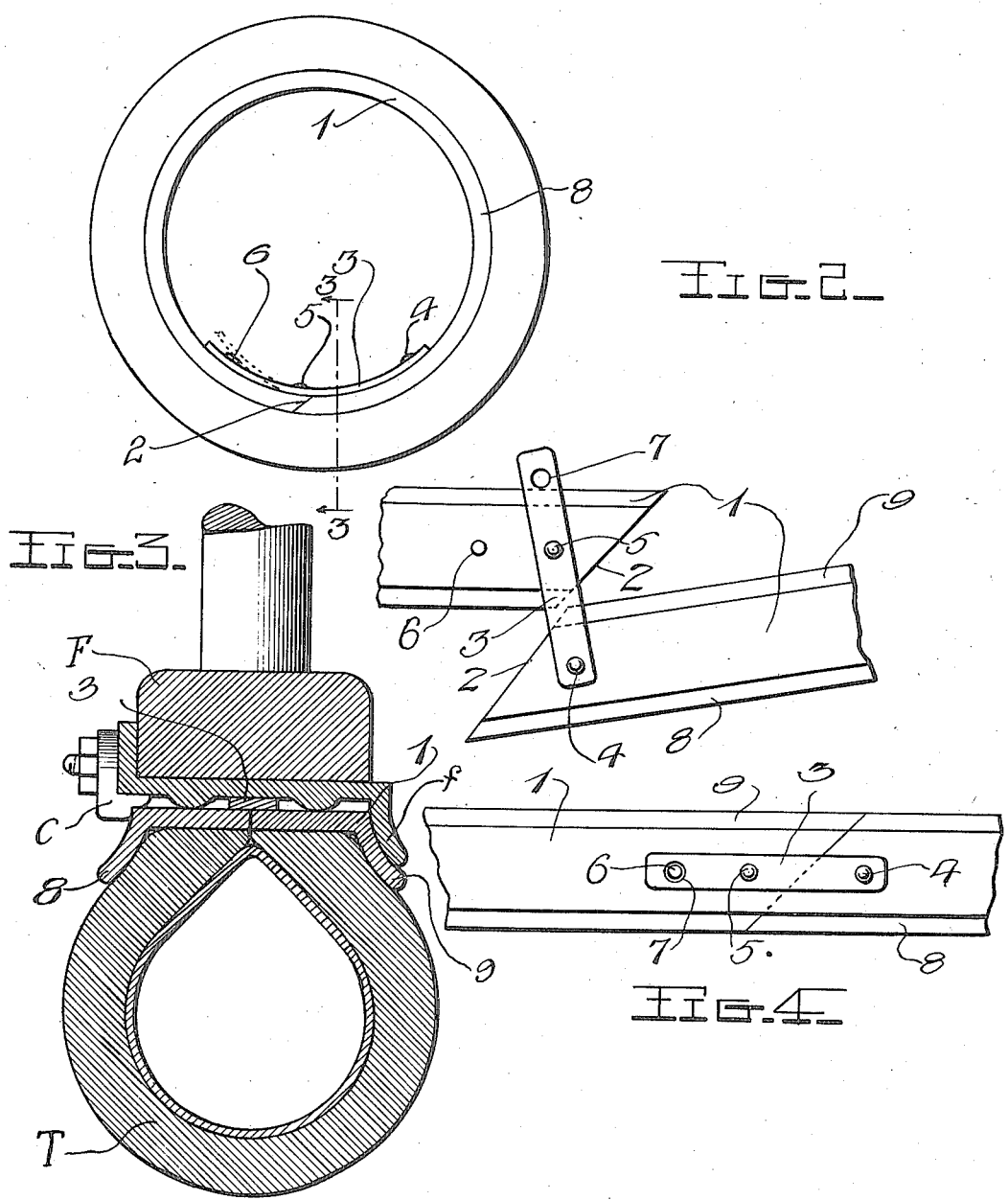

ISAAC B. DACE, OF RUSHVILLE, ILLINOIS.

DEMOUNTABLE RIM.

1,187,820. Specification of Letters Patent. Patented June 20, 1916.

Application filed November 29, 1915. Serial No. 64,087.

*To all whom it may concern:*

Be it known that I, ISAAC B. DACE, a citizen of the United States, residing at Rushville, in the county of Schuyler and State of Illinois, have invented certain new and useful Improvements in Demountable Rims; and I do declare the following to be a full, clear, and exact description of the invention, such as will enable others skilled in the art to which it appertains to make and use the same.

This invention relates to improvements in demountable wheel rims and more particularly to the fastening means therefor.

The object of the invention is to provide a simple and efficient device for varying the diameter of the wheel rim to provide for the quick removal and application of a tire, and to means for holding the rim in adjusted position.

With this and other objects in view, my invention consists of certain novel features of construction and the combination and arrangement of parts to be hereinafter more fully described and claimed.

In the accompanying drawing: Figure 1 represents a side elevation of a rim constructed in accordance with this invention, with a tire shown applied thereto; Fig. 2 is an enlarged detail plan view of the meeting ends of the rim shown in separated position; Fig. 3 is a transverse section taken on the line 3—3 of Fig. 1; and Fig. 4 is a plan view of the meeting ends of the rim shown in closed operative position.

In the embodiment illustrated, a transversely split wheel rim 1 is shown, the ends 2 of which are obliquely inclined in opposite directions from one side edge to the other to provide for their abutting engagement throughout when in operative position to form a continuous rim.

A lever 3 here shown in the form of a substantially arcuate bar, the curvature of which conforms to the curvature of the inner face of the rim 1 to which it is to be applied, is pivoted at one end to the inner face of the rim adjacent one of its beveled or oblique terminals as shown at 4. This lever is pivoted or fulcrumed intermediately of its ends on the other end of the rim 1 on its inner face, the distance between the points where the pivots 4 and 5 pass through, the lever 3 being the same as the combined length of the ends of the rim beyond said pivots, so that when the rim is in closed operative position, with the inclined ends thereof abutting, the lever will operate to span the split in the rim and hold the ends in operative engagement against longitudinal or peripheral movement. The free end of this lever 3 is provided with an aperture 7 positioned to register with and engage a headed stud 6 carried by the inner face of the rim 1 at a point spaced inwardly from the pivot 5 so that when the rim is in locked operative position, with the lever engaging this stud, said lever will be held against lateral movement such as would be liable to release the ends of the rim and permit it to be contracted so that it would become disengaged from the tire which is mounted thereon. This rim 1 may be of any suitable or desired construction otherwise than that above described and is here shown provided on its opposite side edges with upwardly extending annular flanges 8 and 9 to receive and hold a tire T.

This improved rim may be applied to the wheel felly F in any suitable or appropriate manner, and is shown applied to a felly having an upstanding annular flange *f* around the inner edge thereof against which one edge of the demountable rim is designed to abut and which is held in clamping engagement therewith by means of a plurality of detachable clips C which are engaged with bolts extending transversely through the felly. To remove the rim with the tire carried thereby, the clips C are released by unscrewing the nuts on the bolts. After they have been disengaged from the rim 1, the rim is slipped laterally off the felly and is replaced by another rim with an inflated tire ready for use, the clips being secured in position after the new tire and rim have been placed on the felly. After the rim carrying the deflated tire has been removed from the wheel and it is desired to detach said tire from the rim, all that is necessary is to release the free end of the lever 3 by disengaging the aperture 7 thereof from the stud 6 carried by the rim and then swinging said lever laterally whereby the split ends of the rim are twisted and moved out of alinement with each other as shown in Fig. 2 and a sidewise thrust exerted in opposite directions by said ends, thereby forcibly disengaging them from the tire and simultaneously reducing the rim so that the rim is reduced in diameter and thereby readily detaching it from the tire T. To replace a tire on this rim, the rim is disposed in retracted position to adapt it to receive the rim engaging portion of the tire and after the tire has been positioned thereon, the split ends thereof are swung into peripheral or longitudinal alinement by turning the free end of the lever 3 inwardly against the inner face of the rim until the aperture 7 thereof is engaged with the stud 6 and when in this position, the lever will be disposed flat against the inner face of said rim with the pivots thereof in longitudinal alinement, and the inclined split ends of the rim will be disposed in abutting engagement and be thereby held by the interlocking of the aperture 6 and the stud 7. The rim with the tire mounted thereon is then ready for use and may be carried in this position as an emergency tire. This rim 1 is provided with an opening (not shown) for the passage therethrough of the inflating valve on the tire as is usual in rims of this class.

I claim as my invention:

1. A rim split at an oblique angle from one side edge to the other, to permit its abutting ends to be sprung laterally apart, a combined latching and spreading lever arranged on the inner face of the rim and extending across the joint formed by the split, a pivot connecting one end of said lever to one end of said rim, another pivot connecting the other end of said rim to said lever intermediately of its ends, and coöperating locking elements carried by the free end of said lever and said rim.

2. A transversely split wheel rim having the meeting ends thereof inclined obliquely in opposite directions from one side edge to the other, the angles of the two ends being the same to adapt them to be arranged in abutting engagement throughout the width of the rim when in operative position, and whereby the side edges of the rim are disposed in longitudinal alinement, an arcuate lever pivoted at one end to the inner face of said rim adjacent one end thereof and pivotally connected intermediately of its ends to the inner face of the other end of said rim, and adapted to move laterally relatively to said rim, and by means of which said rim ends are held and permitted to shift laterally and longitudinally to contract and expand the rim, the pivots which connect said lever to said rim ends being so disposed as to position the terminals of the rim ends in abutting engagement when the lever is swung laterally into operative position and the pivots into longitudinal alinement, and a coöperating stud and aperture carried one by said rim and the other by the free end of said lever for locking the lever in operative position to hold the ends of the rim in longitudinal abutting engagement against separation.

In testimony whereof I have hereunto set my hand in presence of two subscribing witnesses.

ISAAC B. DACE.

Witnesses:
 JOHN W. BATES,
 M. J. CAMPBELL.